United States Patent [19]
DeCarlo et al.

[11] Patent Number: 5,589,666
[45] Date of Patent: Dec. 31, 1996

[54] ENCLOSURE FOR SEALING A SPLICE OF ELECTRICAL CABLES

[75] Inventors: David J. DeCarlo, Toms River; Thomas L. Mineur, High Bridge; Ronald S. Stanwick, Belvidere, all of N.J.

[73] Assignee: Thomas & Betts Corporation, Memphis, Tenn.

[21] Appl. No.: 55,494

[22] Filed: Apr. 30, 1993

(Under 37 CFR 1.47)

Related U.S. Application Data

[63] Continuation-in-part of Ser. No. 776,139, Oct. 15, 1991, Pat. No. 5,251,373.

[51] Int. Cl.$^6$ ............................................. H02G 15/06
[52] U.S. Cl. ........................ 174/87; 156/48; 174/37; 174/76; 174/77 R; 174/93
[58] Field of Search ........................ 174/87, 77 R, 174/92, 93, 37, 38, 76; 156/48, 49

[56] References Cited

U.S. PATENT DOCUMENTS

| | | | |
|---|---|---|---|
| 3,728,467 | 4/1973 | Klayum et al. | 174/76 |
| 3,806,630 | 4/1974 | Thompson et al. | 174/72 R |
| 3,848,074 | 11/1974 | Channell | 174/38 |
| 3,939,882 | 2/1976 | Gillemot | 156/48 |
| 4,025,717 | 5/1977 | Whittingham | 174/88 C |
| 4,053,704 | 10/1977 | Smith | 174/76 |
| 4,226,651 | 10/1980 | Gold | 174/76 |
| 4,341,922 | 7/1982 | Bossard et al. | 174/92 |
| 4,421,945 | 12/1983 | Moisson | 174/92 |
| 4,490,315 | 12/1984 | Charlebois et al. | 264/40.1 |
| 4,538,021 | 8/1985 | Williamson, Jr. | 174/92 |
| 4,734,543 | 3/1988 | Nolf | 174/88 R |
| 4,902,855 | 2/1990 | Smith | 174/77 R |
| 4,982,054 | 1/1991 | DeBruycker et al. | 174/87 |
| 5,245,133 | 9/1993 | DeCarlo et al. | 174/93 |
| 5,251,373 | 10/1993 | DeCarlo et al. | 29/870 |
| 5,308,923 | 5/1994 | Puigcerver et al. | 174/87 |
| 5,331,114 | 7/1994 | Rudolph | 174/93 |

FOREIGN PATENT DOCUMENTS

| | | |
|---|---|---|
| 0316911 | 5/1989 | European Pat. Off. |
| 1256676 | 7/1961 | France |
| 2388432 | 11/1978 | France |
| 7110096 | 6/1971 | Germany |
| 2319956 | 11/1974 | Germany |
| 2067364 | 7/1981 | United Kingdom |
| 9005401 | 5/1990 | WIPO |

OTHER PUBLICATIONS

Derwent Publication AN 89-361646 Describing JP 1272429, Oct. 31, 1989.

*Primary Examiner*—Morris H. Nimmo
*Attorney, Agent, or Firm*—Michael L. Hoelter; Salvatore J. Abbruzzese

[57] ABSTRACT

A buried service splice enclosure for sealing a splice of telecommunication cables comprises a closure defining an interior space for accommodating the cable splice and defining an opening for receipt of the splice therethrough. A closure seal sealably closes the closure opening and has apertures for receipt therethrough of the cables. Means are provided for sealing the closure seal to the closure and for sealing the cables to the closure seal at the apertures. An inlet fitting, such as a check valve, communicates with the closure interior space and is adapted to receive and pass an encapsulant under pressure into the interior space. An outlet fitting, such as a pressure relief valve, also communicates with the interior space, the pressure relief valve adapted to pass the encapsulant therethrough when the encapsulant is exposed to a predetermined pressure in the closure interior space.

19 Claims, 2 Drawing Sheets

ENCLOSURE FOR SEALING A SPLICE OF ELECTRICAL CABLES

This is a continuation-in-part of U.S. patent application Ser. No. 07/776,139, filed Oct. 15, 1991, now U.S. Pat No. 5,251,313, the disclosure of which is herein incorporated by reference for all purposes. Cross-reference is hereby made to commonly assigned, U.S. patent application Ser. No. 07/776,922, filed Oct. 15, 1991.

FIELD OF THE INVENTION

This invention relates generally to a cable splice enclosure for protecting a splice of electrical cables and more particularly to telecommunications cables.

BACKGROUND OF THE INVENTION

When the insulated conductors of telecommunication cables are spliced together, for repair or for service line extension, the splice area is generally contained within a protective housing known as an enclosure. When such cable splices are made and are used underground, the protective enclosures are commonly referred to as buried service drop enclosures. Such buried enclosures not only must be formed of materials to provide structural rigidity and strength for use underground, but must also protect the splices from the ingress of moisture.

Various known techniques have been introduced in an effort to provide moisture protection for buried cable splices. Many techniques utilize various types of sealants and encapsulants in the enclosure in an effort to prevent the introduction of moisture to the splice area. Some devices utilize grommets and various types of seals to further limit the prospect of moisture entering the splice area, in particular where the splice enclosure is intended to be reentered or reused. Nevertheless, moisture ingress continues to be of concern in the industry and improvements to provide splice enclosures for enhanced protection against moisture introduction are desirable.

SUMMARY OF THE INVENTION

It is an object of the present invention to provide an improved enclosure for the sealing of electrical cable splices.

It is a further object of the present invention to provide such an improved enclosure using an encapsulant introduced under pressure for enhanced sealing of telecommunication cables.

In accordance with a preferred form of the invention, an enclosure for sealing a splice of electrical cables comprises a closure defining an interior space for accommodating a splice of cables and defining an opening for receipt of the splice therethrough. A closure seal is provided for sealably closing the closure opening and having apertures for receipt therethrough of the cables. Means are provided for sealing the closure seal to the closure and for sealing the cables to the closure seal at the apertures. An inlet fitting extends into and communicates with the interior space, the inlet fitting adapted to receive and pass an encapsulant under pressure therethrough into the interior space. An outlet fitting extends into and communicates with the interior space, the outlet fitting adapted to pass the encapsulant therethrough when the encapsulant is exposed to a predetermined pressure in said interior space.

DETAILED DESCRIPTION OF THE PREFERRED EMBODIMENTS

Figure 1:
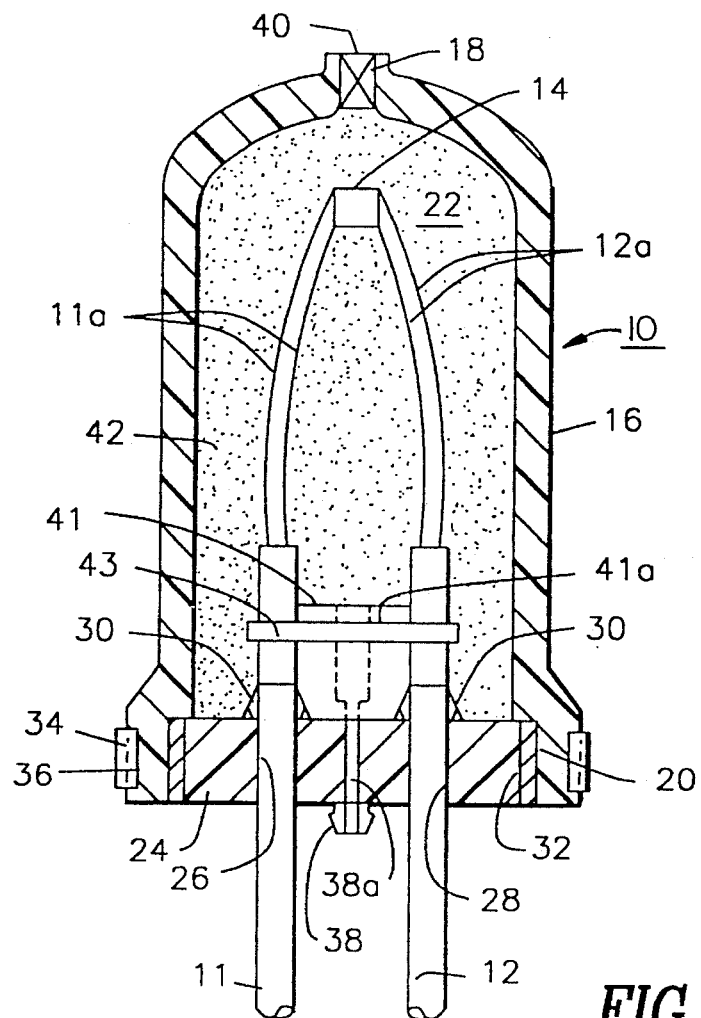
FIG 1. is a cross-sectional view of a splice enclosure in accordance with a preferred embodiment of the invention.

Referring now to the drawing figures, there is shown in FIG. 1 a buried service drop enclosure 10 for sealing a splice of telecommunication cables 11 and 12, in accordance with a preferred arrangement of the invention. Cables 11 and 12 typically contain insulated, multiple conductors 11a and 12a that are spliced together by a conventional splice connector 14. The enclosure 10 is preferably of the type to be utilized underground and, not to be reused or reentered, thereby simplifying the structural complexity over known, reenterable sealing devices.

The enclosure 10 comprises a closure 16 of generally cylindrical shape configuration, closed at its top end except for a vent port 18 and defining at its lower end an opening 20. Opening 20 is preferably substantially circular. The closure 16 thereby defines an interior space 22 for accommodating the spliced cables 11a and 12a. In the preferred construction, the closure 16 is a unitary, integral member molded of plastic material, preferably a high density polyethylene, although other materials may be used, taken into consideration the desirable strength desirable for underground purposes.

Figure 2:
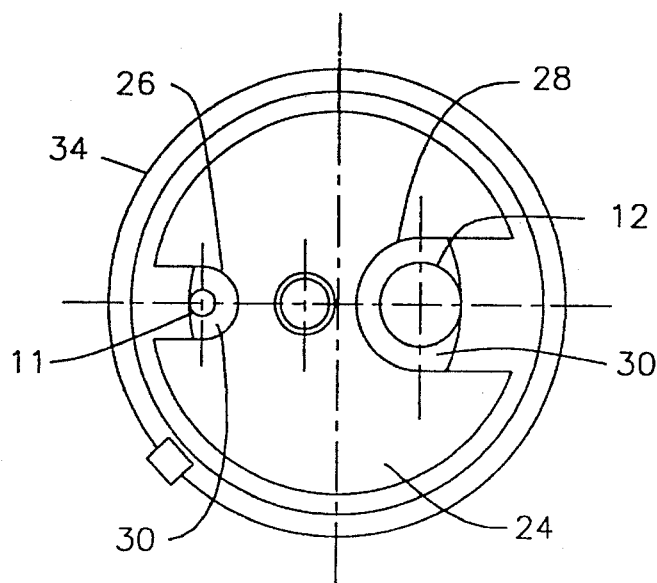
FIG 2. is a bottom view of the enclosure of FIG. 1.

A closure seal 24 is adapted to be received in the bottom of the closure 16 and to sealably close the opening 20. Closure seal 24 is preferably formed in cylindrical disc shape to fit into the substantially circular opening in the bottom of the closure 16. In the preferred arrangement, the disc is molded of a plastic material, preferably polypropylene. Closure seal 24 has apertures 26 and 28, respectively configured to accommodate the telecommunication cables 11 and 12. As can be seen in FIG. 2, apertures 26 and 28 may be formed of different dimensions to accommodate different sizes of telecommunications cables 11 and 12. Further, the apertures 26 and 28 are preferably formed to extend radially into the closure seal 24 in a manner that permits entry of the cables 11 and 12 radially as well as axially. Further, although two cables 11 and 12 with corresponding apertures 26 and 28 are shown, it should be appreciated that any number of cables and apertures may be used, depending upon the desired number of splices to be made.

The cables 11 and 12 are suitably sealed at the apertures 26 and 28 by applying a quantity of sealant, preferably in the form of a butyl mastic tape 30 placed around the outer jacket of the cables 11 and 12 and against the closure seal 24, in a manner as more fully described in commonly assigned, U.S. patent application Ser. No. 07/776,139, filed on Oct. 15, 1991, the disclosure of which is herein incorporated by reference for all purposes.

A seal 32 or gasket of suitable sealing material is wrapped around the circumference of closure seal 24 prior to the insertion of the seal 24 into the enclosure opening 20. Seal 32 may be formed of sealing material, such as butyl mastic, rubber or other elastomeric materials. Once on the closure seal 24, the seal 32 is disposed between the periphery of the closure seal 24 and the inner walls defining the enclosure opening 20.

Disposed at the bottom of the closure 16 and adjacent the closure seal 24 is a clamp 34 that may be received in a groove or recess 36 formed at the lower end of the closure 16. Clamp 34 is adapted to provide pressure for compressing the seal 32 between the bottom of the closure 16 and the closure seal 24 in order to provide a moisture sealed joint. In the preferred arrangement, the clamp 34 comprises a cable tie, such as that sold under the trademark TY-RAP®, marketed by the assignee of the subject invention, although other types of clamps may be utilized.

Supported by the closure seal 24, and preferably molded therein, is an inlet fitting 38. Fitting 38 includes an inlet port 38a that extends through the closure seal 24 and communicates with the closure interior space 22. Inlet fitting 38 may be a conventional check valve that allows entry of an encapsulant, but as the encapsulant pressure increases internally in space 22, the valve closes, thereby preventing backflow of encapsulant out through the valve. The back pressure in the valve in the preferred arrangement is selected to be approximately 5 psig.

At the upper end of the enclosure 10 at vent port 18, and preferably molded therein, is an outlet fitting 40. Vent port 18 and thereby outlet fitting 40 extends into and communicates with the interior space 22 of the closure 16. Outlet fitting 40 may be a conventional pressure relief valve that may be preset by the manufacturer to open to provide pressure relief at a predetermined pressure. For the particular use described herein, it has been determined that a pressure of approximately 15 psig is sufficient to provide the desired sealing effect. Of course, different pressures and pressure ranges for different applications may also be contemplated. In the present application, the pressure relief valves are preset at a pressure of about 15 psig.

A strain relief support 41 is provided to form a strain relief member in cooperation with a clamp 43 as illustrated in FIG. 1. In the preferred arrangement, the strain relief support 41 is formed integrally with the closure seal 24 during molding thereof, although a separate strain relief support member 41 may be used. The strain relief support 41 has an interior opening 41a communicating with the inlet port 38a for passage therethrough of the encapsulant 42. The strain relief support 41 is formed preferably to have recesses or seats for supporting the cables 11 and 12 therein and against which the cables are secured by means of the clamp 43. Clamp 43 is preferably a cable tie, although other clamping devices may be utilized. The strain relief is more particularly described with reference to commonly assigned U.S. patent application Ser. No. 07/776,139, filed Oct. 15, 1991 the disclosure of which is incorporated herein for all purposes.

In use, and once the enclosure 10 has been assembled in a manner as shown and described herein, a suitable encapsulant 42 may then be pumped under pressure into the closure interior space 22 through the inlet fitting 38 to ultimately provide a sealed enclosure splice. The encapsulant may comprise polyurethane which is pumped in fluid form from an external pump suitably attached to the inlet fitting 38. Such encapsulant and pump are more particularly described in commonly assigned U.S. patent application Ser. No. 07/776,139, filed Oct. 15, 1991, the disclosure of which is incorporated herein for all purposes.

In the course of the pumping of the encapsulant fluid into the closure 16 under pressure, any trapped air, as well as the entering encapsulant, are introduced within the enclosure under such pressure. When the pressure within the closure 16 reaches 15 psig, the pressure relief valve 40 opens, thereby allowing any trapped air to initially escape. At this point, the fluid encapsulant is continued to be pumped under pressure into the interior space 22. Subsequent to the release of the air through the pressure relief valve 40, encapsulant sporadically escapes from the valve 40 until a steady stream of encapsulant flows therefrom. At this point, i.e. at 15 psig, the encapsulant is considered sufficiently pressurized to be forced around the cables, into the interstitial openings between the cables, and around any connections in the splice. This thus creates a barrier against water migration throughout the interstices along the cable conductors. Once the steady flow of encapsulant through the pressure relief valve 40 is achieved, the splice enclosure is considered fully encapsulated and no air is present. Pumping of the encapsulant is then stopped and the pump is disconnected from the inlet fitting 38.

Figure 3:
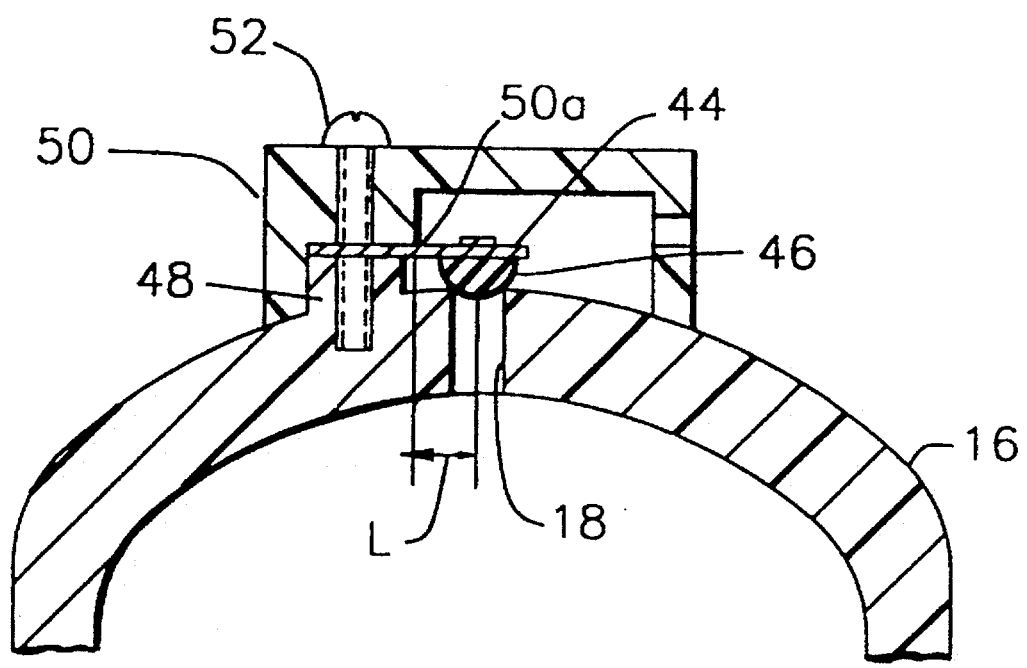
FIG. 3 is a cross-section of a fragmentary portion of the upper end of a splice enclosure showing a particular arrangement of a pressure relief valve for use therewith.

Turning now to FIG. 3, another, particular form of pressure relief valve is illustrated and described. At the upper end of the closure 16 and adjacent the vent port 18, a deflectable spring member 44 is suitably mounted adjacent the port 18. In the preferred arrangement, the deflectable spring member 44 is mounted in cantilevered fashion. At the free distal end of the spring member 44 there is a shut-off plug 46 formed of a resilient material such as rubber, suitably secured and supported thereat.

As illustrated, spring member 44 is supported on a stanchion or boss 48 which may be molded integrally with the closure 16, the spring member 44 being held thereon by a cover 50 which may be suitably attached to the boss 48 by a threaded fastener 52. An inner edge 50a of the cover 50 defines a fulcrum point against which the spring member 44 is deflected when moved upwardly, as will be described.

In the preferred arrangement, the spring member 44 comprises a generally flat strip of metal, having a rectangular cross-section. Such strip may be formed of 0.015 inch thick 1050 blued spring steel, although other suitable materials and configurations may be utilized. The spring member 44 is mounted in a manner to provide a predetermined bias force to the plug 46, thereby compressing the resilient rubber material of the plug 46 and normally closing the vent port 18. The spring member 44 is configured to upwardly deflect when the encapsulant 42 in the interior space 22 reaches the predetermined pressure (for example, 15 psig). At the predetermined pressure, the force of the encapsulant applied to the plug 46 is sufficient to overcome the bias force on the plug 46, thereby separating the plug 46 from the vent port 18 and opening the vent port 18 for passage therethrough of the encapsulant 42 at the predetermined pressure.

In determining the configuration of the spring member 44 needed to upwardly deflect under the influence of the encapsulant reaching the predetermined pressure, the following parameters are to be taken into consideration: the length of the spring member L (i.e., the distance between the fulcrum point 50a and the center of the vent port 18); the cross-sectional area of the spring member 44; and the type of material of the spring member 44 (so that the modulus of elasticity may be determined). By utilizing these parameters and known, well-defined equations for the deflection of cantilevered beams, one may arrive at the configuration needed to deflect the spring member a certain distance under the influence of the upward force applied by the encapsulant to the spring member under pressure thereto.

Having described the preferred embodiments of the invention herein, it should be appreciated that variations thereof may be made thereto without departing from the contemplated scope of the invention. Accordingly, the preferred embodiments as described herein are illustrative rather than limiting. The true scope of the invention is set forth in the claims appended hereto.

We claim:

1. An enclosure for sealing a splice of electrical cables comprising:

a closure defining an interior space for accommodating a splice of cables and defining an opening for receipt of said splice therethrough;

a closure seal for sealably closing said closure opening and having one or more apertures for receipt therethrough of said cables;

means for sealing said closure seal to said closure and for sealing said cables to said closure seal at said one or more apertures;

an inlet fitting extending into and communicating with said interior space, said inlet fitting adapted to receive and pass an encapsulant under pressure therethrough into said interior space; and an outlet fitting extending into and communicating with said interior space, said outlet fitting adapted to pass said encapsulant therethrough when said encapsulant is exposed to a predetermined pressure in said interior space.

2. An enclosure according to claim 1, wherein said inlet fitting is supported by and sealably extends through said closure seal.

3. An enclosure according to claim 2, wherein said inlet fitting comprises a check valve.

4. An enclosure according to claim 2, wherein said end closure comprises a disc of plastic material.

5. An enclosure according to claim 4, wherein said inlet fitting is molded into said plastic disc.

6. An enclosure according to claim 2, wherein said outlet fitting is supported by and sealably extends through said closure.

7. An enclosure according to claim 6, wherein said outlet fitting comprises a pressure relief valve.

8. An enclosure according to claim 6, wherein said closure comprises a unitary, integral member of plastic material, said opening defined by said closure being substantially circular.

9. An enclosure according to claim 8, wherein said outlet fitting is molded into said plastic closure.

10. An enclosure according to claim 1, wherein said means for sealing said closure seal to said closure comprises a member of sealing material selected from the group consisting of elastomerics and mastics.

11. An enclosure according to claim 10, wherein said sealing material is disposed between said closure seal and said closure, and said means for sealing said closure seal to said closure further comprises a pressure member for compressing said sealing material between said closure seal and said closure.

12. An enclosure according to claim 1, wherein said means for sealing said cables to said closure seal at said one or more apertures comprises a tape of mastic material.

13. An enclosure according to claim 11 wherein said pressure member comprises a clamp disposed on an exterior surface of said closure adjacent said opening and said closure seal.

14. An enclosure according to claim 1, further including a cable strain relief member disposed within said interior surface and adjacent said closure seal.

15. An enclosure for sealing a splice of electrical cables of the type including a sealed closure having an interior space accommodating said splice and a pressure relief valve for permitting escape of encapsulant introduced under pressure into said interior space when said encapsulant therein reaches a predetermined pressure, said pressure relief valve comprising:

a port defining an aperture communicating with said interior space; and a deflectable spring member supported adjacent said port and including thereon a plug for closing said port aperture, said spring member being mounted to provided a predetermined bias force to said plug to thereby normally close said port aperture, said spring member being configured to deflect under the influence of said encapsulant applied against said plug at said predetermined pressure in a manner to overcome said bias force and separate said plug from said port aperture, thereby opening said port aperture for passage therethrough of encapsulant at said predetermined pressure.

16. An enclosure according to claim 15, wherein said spring member is supported in a cantilevered manner, said plug being located on said spring member adjacent the free, unsupported end thereof.

17. An enclosure according to claim 16, wherein said spring member comprises a generally flat strip of metal.

18. An enclosure according to claim 17, wherein said strip of metal has a generally rectangular cross-section.

19. An enclosure according to claim 16, wherein said plug comprises a body of resilient elastomeric material secured to said spring member.

* * * * *